United States Patent
Hiraga et al.

(10) Patent No.: US 6,319,321 B1
(45) Date of Patent: Nov. 20, 2001

(54) THIN-FILM FABRICATION METHOD AND APPARATUS

(75) Inventors: Takashi Hiraga; Tetsuo Moriya, both of Tsukuba; Norio Tanaka; Hiromitsu Yanagimoto, both of Tokyo, all of (JP)

(73) Assignee: Agency of Industrial Science & Technology Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 09/009,694

(22) Filed: Jan. 20, 1998

(30) Foreign Application Priority Data

Jan. 20, 1997 (JP) .................................................. 9-007419

(51) Int. Cl.$^7$ ......................... B05C 11/00; C23C 14/22; B05B 1/00; B05D 5/12; H05B 6/06
(52) U.S. Cl. ...................... 118/666; 118/50.1; 118/641; 118/725; 427/553; 427/557; 427/521; 427/372.2
(58) Field of Search .................... 427/512, 515, 427/553, 557, 558, 559, 521, 372.2; 118/50.1, 641, 666, 725, 73, 120

(56) References Cited

U.S. PATENT DOCUMENTS

| | | | |
|---|---|---|---|
| 4,184,188 | * | 1/1980 | Briglia ................................ 361/234 |
| 4,207,356 | * | 6/1980 | Waugh ................................ 427/512 |
| 4,300,272 | | 11/1981 | Hafner et al. . |
| 4,596,852 | * | 6/1986 | Kobayashi et al. .................. 529/550 |
| 4,651,674 | | 3/1987 | Hayashi et al. . |
| 4,687,939 | * | 8/1987 | Miyauchi et al. ................. 250/492.2 |
| 4,977,855 | * | 12/1990 | Ohmi et al. ............................ 118/722 |
| 5,097,800 | * | 3/1992 | Shaw et al. ............................ 427/521 |
| 5,514,852 | * | 5/1996 | Takamori et al. .................... 219/388 |
| 5,597,661 | * | 1/1997 | Takeuchi ................................ 429/42 |
| 5,614,447 | * | 3/1997 | Yamaga et al. ...................... 437/247 |
| 5,705,044 | * | 1/1998 | Washburn et al. ............... 204/298.25 |

FOREIGN PATENT DOCUMENTS

| | | |
|---|---|---|
| 42 28 499 | 10/1993 | (DE) . |
| 0 506 391 | 9/1992 | (EP) . |
| 0 671 219 | 9/1995 | (EP) . |
| 1 318 818 | 5/1973 | (GB) . |
| 63-243298 | 10/1988 | (JP) . |
| 4-99609 | 3/1992 | (JP) . |
| 6-202179 | 7/1994 | (JP) . |
| 6-263885 | 9/1994 | (JP) . |
| 6-306181 | 11/1994 | (JP) . |
| 7-252671 | 10/1995 | (JP) . |
| 8-95101 | 4/1996 | (JP) . |

OTHER PUBLICATIONS

Translation of 6–306181, Japanese put. to Takashi et al. previously cited, Nov. 1994.*

Translation of JP 07252671 to Takaashi et al both previously cited, Oct. 1995.*

* cited by examiner

Primary Examiner—Richard Crispino
Assistant Examiner—J. A. Lorengo
(74) Attorney, Agent, or Firm—Oblon, Spivak, McClelland, Maier & Neustadt, P.C.

(57) ABSTRACT

A thin-film fabrication method includes a spray step in which at least one thin-film composition material in liquid form is sprayed into a vacuum vessel via a spray nozzle provided for each thin-film composition material and deposited on a substrate, and a heat treatment step in which the material deposited on the substrate is heat treated. The substrate temperature in the spray step and/or the heat treatment step is controlled within a prescribed temperature range.

38 Claims, 5 Drawing Sheets

THIN-FILM FABRICATION METHOD AND APPARATUS

BACKGROUND OF THE INVENTION

1. Field of the Invention

The present invention relates to a method and apparatus for fabricating thin films. More particularly, the present invention relates to a new thin-film fabrication method and thin-film fabrication apparatus that enables high quality, high efficiency production of high-function optical thin films that are particularly useful for wavelength-selectable transmitting films, reflecting films, nonlinear optical effect films, optoelectronic conversion apparatuses, photoconductive films, optical recording media, organic electroluminescence elements, image display apparatuses, spatial photomodulators and other such areas of optical technology, optoelectronics technology and the like.

2. Description of the Prior Art

Optical thin films having various types of compositions have been put to use in various fields of application. For example, there are optical thin films which use reflection functions and wavelength-selectable transmission utilizing light absorption or interference.

Especially in recent years, in optoelectronics fields utilizing laser light, considerable progress is being made into the development of optical thin films having high functions that differ from before, for high-speed multi-dimensional parallel processing of information using multiplicity of light, or nonlinear optical effects and the photoelectric effect.

As materials used to form such high-function optical thin films, attention has focused on organic optical materials. Numbers of studies are being pursued relating to methods of fabricating organic optical thin films using the organic optical materials. The following are examples of methods that are known.

(1) Wet Methods Using Solvents, Dispersions, or Developers

Coating methods such as the application method, blade coating method, roll coating method, spin coating method, dipping method and spray method; printing methods such as lithography, relief, intaglio, perforated plate, screen, and transfer printing; electrochemical methods such as electro-deposition, electro-polymerization, and micell electrolysis (see, for example, JP-A-63-243298); and other methods such as the Langmuir blow-jet method of using monomolecular films formed on water.

(2) Methods Using Reactions Into High-polymer Compounds, Such as Polymerization of Monomer Source Material These methods include the casting method, reaction—injection—molding method, plasma polymerization method and photo-polymerization method.

(3) Methods Using Gas Molecules (vaporization by heating)

These methods include the sublimation transfer method, vapor deposition method, vacuum vapor deposition method, ion-beam method, sputtering method, plasma polymerization method and photo-polymerization method.

(4) Methods Utilizing Melting or Softening

These methods include the hot press method (see, for example, JP-A-4-99609), the injection molding method, the extrusion method, and the method of single crystallization of molten thin films.

However, the optical thin-films formed by all of these conventional fabrication methods are limited to a relatively simple composition and structure, and are not suitable for fabricating high-function organic optical thin-films allowing a higher level of fine structural control. For example, a material such as organic ionic crystal that has no melting point is decomposed by heating, and even if the material does have a melting point, it decomposes at the vaporization temperature, making it difficult to control such phenomena, or to realize high-function, organic optical thin-films based on such control.

In JP-A-6-306181 and JP-A-7-252671, the present inventors described one means for resolving such problems. Specifically, the disclosures described a method and apparatus for fabricating an organic optical thin-film by spraying an organic optical material in the form of a solvent or dispersion into a high-vacuum vessel to deposit the material onto a substrate, followed by heat treatment. This method made it possible to fabricate an optical thin-film with control of fine structures in the sub-micrometer range at temperatures far lower than the decomposition temperature of organic optical materials.

With the above-described prior-art method and apparatus for fabricating organic, optical thin films, cleaning of the surface of the substrate for deposition of the thin-film material had to be done outside the apparatus. However, in the course of moving the cleaned substrate to the thin-film fabrication apparatus, the effect of the cleaning was reduced by exposure to floating particulate matter and/or contaminating gases, reducing the strength of the adhesion between the thin film and the substrate. Moreover, when it was required to increase the durability of the fabricated thin film by sealing the film in a material that acted as a barrier to gases, the sealing also had to be done outside the fabrication apparatus.

Again, however, removal of the substrate from the apparatus exposed the substrate surface and surrounding portions to floating particulate matter and/or contaminating gases, reducing the effectiveness of the sealing process and decreasing the durability of the thin film.

Thus, the conventional thin-film fabrication method had inherent limitations with respect to the efficient fabrication of high-function thin films.

An object of the present invention is to overcome the above-described drawbacks of the prior art by providing a thin-film fabrication method and apparatus that enables more efficient fabrication of thin films that offer high durability, high adhesion to the substrate and a high level of control of microstructures without giving rise to heat-decomposition of the thin-film composition materials.

SUMMARY OF THE INVENTION

To attain the above object, the present invention provides a thin-film fabrication method comprising a spray step in which at least one thin-film composition material in liquid form is sprayed into a vacuum vessel via a spray nozzle provided for each thin-film composition material and deposited on a surface of a substrate, and a heat treatment step in which the material deposited on the substrate surface is heat treated; and further comprising a control step in which a substrate temperature in at least one of the spray step and the heat treatment step is controlled within a temperature range (hereinafter referred to as the control temperature range) having a lower limit defined as a temperature that exceeds a lowest temperature of a group of temperatures (1) to (3) described below selected depending on constituent components of the thin-film composition material used, and an upper limit defined as a temperature that does not exceed a heat decomposition initiation temperature of whichever thin-film composition material component has a heat decomposition temperature that is lower than a heat decomposition temperature of other thin-film composition material components; the group of temperatures being:
(1) in the case of a thin-film composition material that includes a component containing a thermoplastic high-molecular compound, a melt initiation temperature of the component containing the thermoplastic high-molecular compound,
(2) in the case of a thin-film composition material that contains an organic or inorganic high-molecular compound precursor, a polymerization initiation temperature, and
(3) in the case of a thin-film composition material that contains an organic or inorganic cross-linking agent or bridged compound, a temperature at which a cross-linking reaction is initiated.

The thin-film fabrication method of the present invention also includes a cleaning step in which the substrate surface is cleaned in a clean, sealed vessel having neither floating particles nor contaminant gases, the sealed vessel being provided within the vacuum vessel or connected with the vacuum vessel via an airtight door, the cleaning step being effected prior to the spray step. In this method, the spray step is effected without exposing the substrate surface to either floating particles or contaminant gases.

The thin-film fabrication method of the invention also includes controlling the substrate temperature within the control temperature range by using a substrate provided with a removable conductive exothermic film on the side opposite the surface on which the thin film is fabricated and passing electricity through the conductive exothermic film to heat said film.

The thin-film fabrication method of the invention also includes controlling the substrate temperature within the control temperature range by using a substrate provided with a removable visible light and/or infrared absorbing film on the side opposite the surface on which the thin film is fabricated, and heating the visible light and/or infrared absorbing film by irradiating it with light having a wavelength within a range absorbed by the film.

The thin-film fabrication method of the invention also includes controlling the substrate temperature within the control temperature range by using a substrate provided with a removable conductive magnetic film on the side opposite the surface on which the thin film is fabricated, and heating the conductive magnetic film by eddy current produced by irradiating the conductive magnetic film with electromagnetic waves from an induction coil.

The thin-film fabrication method of the invention also includes controlling the substrate temperature within the control temperature range by using a non-volatile liquid or fluid to adhere the substrate to a substrate support and heating the substrate support electrically, or by visible light and/or infrared irradiation, or by induction current.

The thin-film fabrication method of the invention also includes controlling the substrate temperature within the control temperature range by using a rubber-like resilient substance to adhere the substrate to a substrate support and heating the substrate support electrically, or by visible light and/or infrared irradiation, or by induction current.

The thin-film fabrication method of the invention also includes a press-forming step following heat treatment of the material deposited on the substrate.

The thin-film fabrication method of the invention also includes controlling the substrate temperature within the control temperature range during the above-described press-forming.

The thin-film fabrication method of the invention also includes sealing the fabricated thin film without removal into the atmosphere, in a clean, sealed vessel having no floating particles and/or contaminant gases, the sealed vessel being within the vacuum vessel or connected with the vacuum vessel via an airtight door.

In accordance with the present invention, the above object is also attained by a thin-film fabrication apparatus comprising:
a vacuum vessel,
at least one spray nozzle provided within the vacuum vessel for each thin-film composition material that is to be sprayed,
a substrate on which the thin-film composition material is deposited,
measuring means for measuring substrate temperature,
heating means for heating substrate to within control temperature range,
control means for controlling the heating means, and
evacuation means for evacuating the vacuum vessel.

The thin-film fabrication apparatus of the present invention also includes means for cleaning the substrate prior to the substrate surface spray step, the cleaning means being provided in a clean, sealed vessel having no floating particles and/or contaminant gases, the sealed vessel being provided within the vacuum vessel or connected with the vacuum vessel via an airtight door.

The thin-film fabrication apparatus of the invention also includes the vacuum vessel being comprised as two or more vessels connected by a transport chamber equipped with airtight doors to each vacuum vessel,
wherein at least one of the vacuum vessels is used as a substrate pretreatment vessel for which it has cleaning means for cleaning the substrate surface, transportation means for transporting the substrate into the vacuum vessels and evacuation means for evacuating the vacuum vessels;
and at least one of the remaining vacuum vessels is used as a vacuum spray vessel for which it has at least one spray nozzle for each thin-film composition material that is to be sprayed, a substrate on which the thin-film composition material is deposited, measuring means for measuring substrate temperature, heating means for heating the substrate to within the control temperature range, control means for controlling the heating means, transportation means for transporting the substrate into the vacuum vessels and evacuation means for evacuating the vacuum vessels.

The thin-film fabrication apparatus of the invention also includes press-forming means for press-forming the material deposited on the substrate.

The thin-film fabrication apparatus of the invention also includes sealing means for sealing the fabricated thin film in a clean, sealed state free of floating particles and/or contaminant gases, the sealed vessel being within the vacuum vessel or connected with the vacuum vessel via an airtight door.

The thin-film fabrication apparatus of the invention also includes means of supporting the substrate in the vacuum vessel provided with bonding support means and substrate heating means.

The thin-film fabrication apparatus of the invention also includes use of electrical heating means as the substrate heating means.

The thin-film fabrication apparatus of the invention also includes use of visible light and/or infrared heating means as the substrate heating means.

The thin-film fabrication apparatus of the invention also includes use of induction current heating means as the substrate heating means.

The thin-film fabrication apparatus of the invention also includes, as the substrate heating means, use of a removable conductive exothermic film, visible light and/or infrared light absorbing film, or conductive magnetic film on the side of the substrate opposite the surface on which the thin film is fabricated.

In accordance with this invention, before thin-film composition material in liquid form is sprayed onto the substrate, the substrate surface is cleaned in a sealed vessel free of floating particles and/or contaminant gases that is located inside the vacuum vessel or connected to the vacuum vessel via an airtight door, ensuring that the material can be sprayed onto a substrate surface not exposed to floating particles and/or contaminant gases, and thereby improving the strength of the adhesion between the formed thin film and the substrate.

Moreover, since in accordance with the present invention the fabricated thin film can be sealed without removal into the atmosphere, in a clean, sealed vessel having no floating particles and/or contaminant gases, the sealed vessel being provided within the vacuum vessel or connected with the vacuum vessel via an airtight door, the thin film is completely uncontaminated, and therefore has improved durability.

Further features of the invention, its nature and various advantages will be more apparent from the accompanying drawings and following detailed description of the invention.

DESCRIPTION OF THE PREFERRED EMBODIMENT

Figure 1:
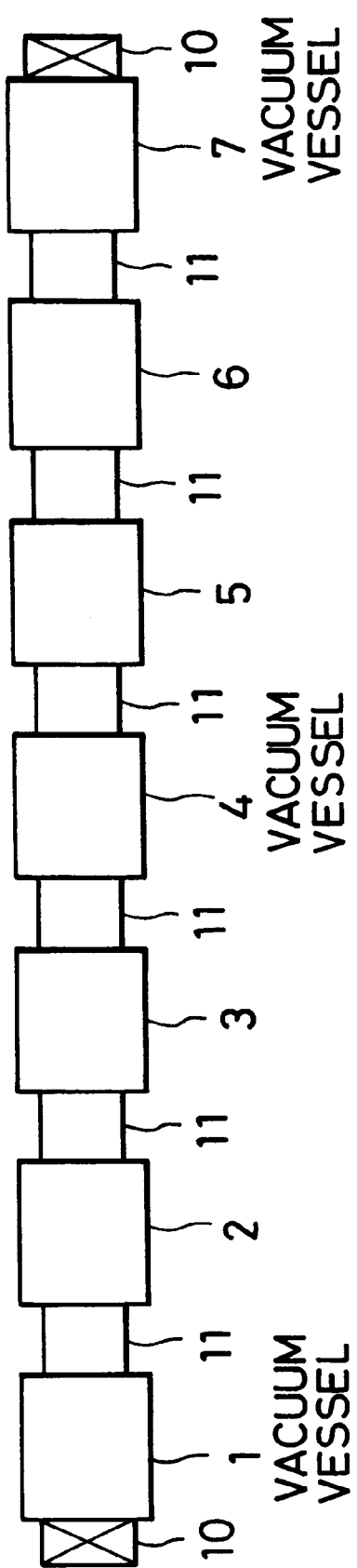
FIG. 1 is a schematic view showing the general configuration of a thin-film fabrication apparatus that is a first embodiment of the present invention.

The thin-film fabrication method according to the present invention comprises a spray step in which at least one thin-film composition material in liquid form is sprayed into a vacuum vessel via a spray nozzle provided for each thin-film composition material and deposited on a substrate, a heat treatment step in which the material deposited on the substrate is heat treated at a prescribed temperature, and a control step in which the substrate temperature in at least one of the spray step and the heat treatment step is controlled within the control temperature range. If the substrate temperature is less than the lower limit of the control temperature range, the material deposited on the substrate will lack in fluidity, resulting in failure to form a flat, smooth thin-film. If it is more than the upper limit of the control temperature range, the material will exhibit high fluidity to flow out and thermally decompose, resulting in failure to fabricate a good thin-film.

The following are examples of the thin-film composition material liquid that can be used in this invention.

(1) A solution or dispersion formed by dissolving or dispersing a thermoplastic high-molecular compound in a volatile solvent.

(2) A solution or dispersion formed by dissolving or dispersing a non-volatile, thermoplastic, organic high-molecular compound precursor (monomer or oligomer) in a volatile solvent.

(3) A solution or dispersion formed by dissolving or dispersing a non-volatile, thermosetting, organic high-molecular compound precursor (monomer or oligomer) in a volatile solvent.

(4) A solution or dispersion formed by dissolving or dispersing a non-volatile, inorganic high-molecular compound precursor (monomer or oligomer) in a volatile solvent.

(5) A solution or dispersion formed by dissolving or dispersing an organic low-molecular compound in a solution or dispersion described above.

(6) Microparticles of semiconductors such as selenium, tellurium, germanium, silicon, silicon carbide, copper chloride, cadmium sulfide, cadmium selenide, Cd—ZnM—n—Se—Te—S—O, and Ga—In—Al—As—P in the above solutions or dispersions, and dispersions of microparticles of metal such as gold colloid.

(7) A solution or dispersion formed by adding an organic and/or inorganic cross-linking agent or a bridged compound to an above-described solution or dispersion.

Since in accordance with the thin-film fabrication method of this invention, at least one thin-film composition material in the form of a solution or dispersion is sprayed into a high-vacuum vessel via a spray nozzle provided for each thin-film composition material, it is possible to select an optimum solution or dispersion for each component, and/or set an optimum solution or dispersion concentration for each component.

More specific examples of thin-film forming material components are listed below.

Thermoplastic, Organic, High-moleocular Compounds

Specific examples of thermoplastic, organic, high-molecular compounds that can be used as a component of the thin-film forming material in this invention include polystyrene, poly($\alpha$-methylstyrene), polyindene, poly(4-methyl-1-pentane), polyvinyl pyridine, polyvinyl formal, polyvinyl acetal, polyvinyl butyral, polyvinyl acetate, polyvinyl alcohol, polyvinyl chloride, polyvinylidene chloride, polyvinyl methyl ether, polyvinyl ethyl ether, polyvinyl benzil ether, polyvinyl methyl ketone, poly(N-vinylcarbasole), poly(N-vinylpyrrolidone), polymethyl acrylate, polyethyl acrylate, polyacrylate, polyacrylonitrile, polymethyl methacrylate, polyethyl methacrylate, polybutyl methacrylate, polybenzil methacrylate, polycyclohexyl methacrylate, polymethacrylate, polyamide methacrylate, polymethacrylonitrile, polyacetoaldehyde, polychloral, polyethylene oxide, polypropylene oxide, polyethylene terephthalate, polybutylene terephthalate, polycarbonates (bisphenols+carbonic acid), poly(diethylene glycol bisaryl carbonates), 6-nylon, 6,6-nylon, 12-nylon, 6,12-nylon, polyethyl asparaginate, polyethyl glutamate, polylysine, polyproline, poly($\gamma$-benzil-L-glutamate), methyl cellulose, ethyl cellulose, benzil cellulose, hydroxyethyl cellulose, hydroxypropyl cellulose, acetyl cellulose, cellulose triacetate, cellulose tributylate, resins including polyurethane resin, organic polysilanes including poly(phenyl methyl silane), organic polygermane, copolymers and copolycondensates of these, and thermoplastic high-molecular compounds obtained by polymerizing with plasma compounds generally not polymerized, such as carbon disulfide, carbon tetrafluoride, ethylbenzene, perfluorobenzene, perfluorocyclohexane, and trimethylchlorosilane.

These thermoplastic, organic high-molecular compounds may contain residue radicals of organic coloring matter or organic low-molecular compounds exhibiting photo-nonlinearity, as monomer unit side chains, as cross-linked groups, as copolymer monomer units, or as polymerization initiator terminals.

The above thermoplastic, organic high-molecular compounds dissolved or dispersed in a volatile solvent may be used as a thin-film composition liquid material of this invention.

Moreover, if the precursors (monomer or oligomer) of the above thermoplastic, organic high-molecular compounds are non-volatile, the precursors dissolved or dispersed in a volatile solvent also may be used as a thin-film composition liquid material of this invention.

Moreover, the above thermoplastic, organic high-molecular compounds and/or the precursors thereof to which a suitable cross-linking agent has been added may also be used.

The above thermoplastic, organic, high-molecular compounds and/or the precursors thereof may be bridged compounds having a cross-linking functional group. Such compounds are generally classified into the following thermosetting high-molecular compounds.

Thermosetting, Organic, High-molecular Compounds and the Precursors Thereof

Soluble, non-volatile thermosetting, organic high-molecular compounds and their precursors and, when required, non-volatile setting agents as well as polymerization initiators dissolved or dispersed in a non-volatile solvent may be used as a thin-film composition liquid material of this invention. Below are listed and described specific examples of thermosetting, organic high-molecular compounds and their precursors that may be used in the present invention.

Alkyd Resin

Gelling occurs when the velocity of reactions between two or three functional groups is increased, such as when glycerin is combined with a dibasic acid such as phthalic anhydride. The soluble resins obtained by stopping the reaction prior to gelling are collectively referred to as thermosetting alkyd resins. Heating a film that has been formed by precursors of such a thermosetting, organic, high-molecular compound sets (solidifies) the material into a non-soluble film.

Fatty Acid Modified Alkyd Resin

By adding a fatty acid to the dibasic acid and glycerin that are components of thermosetting alkyd resins, fatty acid modified alkyd resin is produced that restrains the above gelling and, by imparting pliability to the thermosetting resin that has set, enables the shock-resistance to be improved.

Unsaturated Polyester Resin

With polyester produced by polycondensation, using dibasic acid or glycol having a double bond provides cross-linkable polyester having an unsaturated radical. Generally, fumaric acid or maleic acid or the like can be used as an unsaturated dibasic acid. Also, propylene glycol or the like can be used as the glycol having a double bond. Heating a polyester having an unsaturated radical to which an appropriate polymerization initiator has been added produces a bridging reaction, resulting in thermosetting.

Epoxy Resin

Epoxy resins having an epoxy radical on both terminals can be obtained by adjusting the base catalyst polycondensation conditions of bisphenols and epichlorohydrin. A film formed by a solution of this resin to which a setting agent has been added is set by heating. Non-volatile setting agents that can be used in this invention include agents that readily add open rings to the terminal epoxy group or readily give rise to esterification reaction with the hydroxyl group in the chain. Amines are examples of usable setting agents that add open rings, and dibasic acids and acid anhydrides thereof are examples of usable setting agents that produce esterification.

Thermosetting Resin Produced by Addition Condensation

Reacting formaldehyde with an aromatic hydrocarbon (such as phenol, toluene, xylene) or compounds having an amino group (such as urea, melamine, guanamine) produces a soluble high-molecular compound having a relatively low molecular weight. This resin sets (solidifies) when it is heated or heated with a suitable setting agent. These resins are referred to, in accordance with their source material, as phenol resin, urea resin, melamine resin, xylene resin, toluene resin, guanamine resin, and so on.

A solution or dispersion obtained by dissolving or dispersing a non-volatile setting agent or a polymerization initiator in a solution or dispersion having precursors of the above thermosetting, organic high-molecular compounds dissolved or dispersed in a volatile solvent, can be used as the thin-film composition material of this invention.

Cross-linking Agent

Below are examples of non-volatile cross-linking agents that may be used as a component of the thin-film composition material of this invention, listed by type of cross-linking reaction.

(1) Divinyl Compounds and the Like

The double bond portions between the two carbons of divinyl compounds and the like produce a four-center-type reaction with the double bond between the carbons being linked, forming a cyclobutane ring that promotes the cross-linking reaction.

Reacting a divinyl compound with a high molecular compound having a thiol group results in cross-linking by the formation of sulfide links.

(2) Diisocyanate

Reacting diisocyanate with a high molecular compound having an alcoholic hydroxyl group or amino group produces cross-linking by forming urethane bonds or urea links.

(3) Bisketene

Reacting a compound having two ketene groups with a high molecular compound having an amino group promotes cross-linking by forming amide links.

(4) Bisethyleneimine

Reacting bisethyleneimine with a high molecular compound having an alcoholic hydroxyl group produces cross-linking through the formation of ether amine links.

(5) Bisethylene Urethane

Reacting bisethylene urethane with a high molecular compound having an alcoholic hydroxyl group produces cross-linking by forming ether urethane links.

(6) Bisepoxide

Reacting bisepoxide with a high molecular compound having an alcoholic hydroxyl group promotes cross-linking by forming ether links.

(7) Diol

A compound having two alcoholic hydroxyl groups promotes cross-linking by forming ether links with a compound having a carboxylic acid group.

(8) Dicarboxylic acid

A compound having two dicarboxylic acid groups promotes cross-linking by forming ester links with a compound having an alcoholic hydroxyl group.

Also, a compound having two carboxylic acid groups cross-links by forming amide links with a compound having an amino group.

(9) Diamine

A compound having two amino groups promotes cross-linking by each of the amino groups forming amides or imides with a compound having a carboxylic acid group.

(10) Carboxylic Acid Anhydride

A compound having two carboxylic acid anhydride structures within its molecules (tetracarboxylic acid anhydride) cross-links by forming imide links with a compound having an amino group.

(11) Dichlorosilane Derivatives

Non-volatile dichlorosilane derivatives with long-chain alkyl group links acting on a high molecular compound having a silanole group (SiOH) to effect dehydrochlorination condensation promotes cross-linking by forming siloxane links (O—Si—O—).

(12) High molecular compounds known as silane coupling agents and titanium coupling agents cross-link by condensation reaction of an organic high-molecular compound with a polar functional group such as a hydroxyl group bonded to the substrate surface. Coupling agents such as these that are non-volatile also may be used as a component of the thin-film composition material of this invention.

Organic Low-molecular Compounds

Specific examples of organic low-molecular compounds that may be used as a component of the thin-film composition material of this invention include secondary nonlinear optical active substances such as urea and the derivatives thereof, benzene derivatives such as m-nitroaniline, 2-methyl-4-nitroaniline, 2-(N,N-dimethylamino)-5-nitroacetoanilide and N,N'-bis(4-nitrophenyl)methane diamine, biphenyl derivatives such as 4-methoxy-4'-nitrobiphenyl, stilbene derivatives such as 4-methoxy-4'-nitrostilbene, pyridine derivatives such as 4-nitro-3-picoline=N-oxide and (S)-(-)-N-(5-nitro-2-pyridyl)-prolinol, calcon derivatives such as 2',4',4'-trimethoxycalcon, and thienylcalcon derivatives; organic coloring matter; organic pigments; organic photoconductive materials; organic electroluminescence materials; charge transporting agents (hole transporting agents and electron transporting agents); organic photorefractive materials; and liquid crystals.

Liquid Crystals

Specific examples of liquid crystals that may be used as a component of the thin-film composition material of this invention include liquid crystals of cholesterol derivatives, 4'-alcoxy benzylidene-4-cyanoanilines such as 4'-n-butoxybenzylidene-4-cyanoaniline and 4'-nhexylbenzylidene-4-cyanoaniline, 4'-alkoxybenzylidene anilines such as 4'-ethoxybenzylidene-4-n-butylaniline, 4'methoxybenzylidene aminoazobenzene, 4'-(4'methoxybenzylidene)aminobiphenyl and 4'-(4'methoxydenzylidene)aminostilbene, 4'-cyanobenzylidene-4alkoxyanilines such as 4'-cyanobenzylidene-4-n-butoxyaniline and 4'-cyanobenzylidene-4-n-hexyloxyaniline, carbonic acid esters such as 4'-n-butoxycarbonyl oxybenzylidene-4-methoxyaniline, p-carboxyphenyl-n-amylcarbonate and n-heptyl-4-(4'ethoxyphenoxycarbonyl)phenylcarbonate, 4-alkylbenzoic acid4'-alkoxyphenyl esters such as 4-n-butylbenzoic acid-4'-ethoxyphenyl, 4-n-butylbenzoic acid-4'-octyloxyphenyl and 4-n-pentylbenzoic acid-4'-hexyloxyphenyl, azoxybenzene derivatives such as 4,4'-di-n-amyloxyazoxybenzene and 4,4'-di-n-nonyloxyazoxybenzene, 4-cyano-4'-alkylbiphenyls such as 4-cyano-4'-n-octylbiphenyl and 4-cynano-4'-n-dodecylbiphenyl; and ferroelectric liquid crystals of (2S, 3S)-3-methyl-2-chloropentanoic acid-4',4"-octyloxybiphenyl, 4'-(2-methylbutyl)biphenyl-4-carboxylic acid-4-hexyloxyphenyl and 4'-octylbiphenyl-4-carboxylic acid-4-(2-methylbutyl)phenyl.

Volatile Solvents

The organic high-molecular compounds, organic low-molecular compounds and liquid crystals listed above are dissolved or dispersed in a volatile solvent and sprayed into the high-vacuum vessel. Any solvent may be used that can dissolve or disperse the above thin-film composition materials, and is volatile and non-corrosive.

Specific examples of solvents that can be used include alcohols such as methanol, ethanol, isopropyl alcohol, n-butanol, amyl alcohol, cyclohexanol and benzyl alcohol; polyalcohols such as ethylene glycol, diethylene glycol and glycerin; esters such as ethyl acetate, n-butyl acetate, amyl acetate and isopropyl acetate; ketones such as acetone, methylethyl ketone, methyl isobutyl ketone and cyclohexanone; ethers such as diethyl ether, dibutyl ether, methoxy ethanol, ethoxy ether, butoxy ether and carbitol; cyclic ethers such as tetrahydrofuran, 1,4-dioxane and 1,3-dioxolan; halogenated hydrocarbons such as dichloromethane, chloroform, carbon tetrachloride, 1,2-dichloroethane, 1,1,2-trichloroethane and trichlene; aromatic hydrocarbons such as benzene, toluene, xylene, chlorobenzene, o-dichlorobenzene, nitrobenzene, anisole and $\alpha$-chloronaphthalene; aliphatic hydrocarbons such as n-pentane, n-hexane, n-heptane and cyclohexane; amides such as N,N-dimethylformamide, N,N-dimethylacetamide and hexamethyl phosphoric triamide; cyclic amides such as N-methylpyrrolidone; urea derivatives such as tetramethylurea and 1,3-dimethyl-2-imidazolidinone; sulfoxides such as dimethyl sulfoxide; carbonic acid esters such as ethylene carbonate and propylene carbonate; nitriles such as acetonitrile, propionitrile and benzonitrile; nitrogen-containing heterocyclic compounds such as pyridine and quinoline; amines such as triethylamine, triethanolamine, diethylamino alcohol and aniline; nitromethane; carbon disulfide; sulfolane; water; and aqueous ammonia.

A mixture of a plurality of these solvents may also be used. Substrate

Any substrate may be used that is of a substance and shape meeting the following requirements.

(1) The substrate must have a surface smoothness and size that comply with the thin-film design specifications.
(2) The substrate must be formed of a material that does not allow intrusion by the thin-film composition liquid.
(3) The substrate must be able to withstand the temperatures used in the heat treatment of the thin-film composition material deposited on the substrate.
(4) The substrate must be able to withstand the pressure used to press-form the thin film.
(5) The substrate must not have any component that is volatile under the high-vacuum conditions used in the thin-film fabrication method of the invention (a vacuum pressure of approximately $10^{-4}$ Pa or below).
(6) The substrate must be able to withstand the substrate surface cleaning treatment.
(7) After the substrate surface has been cleaned, there must be no exudation of contaminants from the interior of the substrate.

The substrate may be formed of, for example, optical glass, quartz glass, metal or the like.

Pretreatment comprising cleaning of the surface of the substrate in a clean, sealed vessel free of dust and/or contaminating gases in accordance with the thin-film fabrication method of this invention may be effected by a known method. In the case of optical glass, for example, organic contaminants adhering to the surface may be oxidized by a dichromic acid solution of sulfuric acid, then removed, the substrate washed in ultrapure water, then washed in ethanol, and the surface dried by vaporizing the ethanol.

Substances Having Gas Barrier Properties

The substrate may be formed of a substance through which gas does not permeate during the sealing of the thin film. For example, in the case of fabrication of the thin film between two sheets of glass, glass is also a substrate and also acts as a gas barrier.

Optical glass, quartz glass or metal-based substance having gas barrier properties is an organic high-molecular compound having low permeability to gases of oxygen molecules or water vapor. Epoxy resin may be used. However, an organic high-molecular compound used alone may have insufficient gas barrier properties, so it is more effective to use an epoxy-based adhesive combined with metal foil or the like.

Details of the invention will now be described with reference to the drawings.

EXAMPLE 1

The arrangement of the thin-film fabrication apparatus of this invention is shown in FIGS. 1 to 4. FIG. 1 shows an apparatus that is a first embodiment of the present invention, comprising a vacuum vessel 1 used as an entry airlock for the entry of the substrate, a vacuum vessel 2 in which the substrate is cleaned, a vacuum vessel 3 in which the spraying step is carried out, a vacuum vessel 4 for carrying out the heat treatment, a vacuum vessel 5 for the press-forming step, a vacuum vessel 6 for sealing the thin film, and a vacuum vessel 7 used as an exit airlock for the exit of the thin film, all of the vacuum vessels being arranged in a straight line via airtight doors 11. The apparatus configuration of FIG. 1 is adapted for volume production of thin films by independently carrying out each of the process steps of substrate entry, cleaning of the substrate surface, spraying onto the substrate, heat treatment of the thin-film composition material deposited on the substrate, press-forming of the thin film, sealing of the thin film, and thin-film egress. Reference numeral 10 denotes an entrance and an exit for the substrate.

Figure 2:
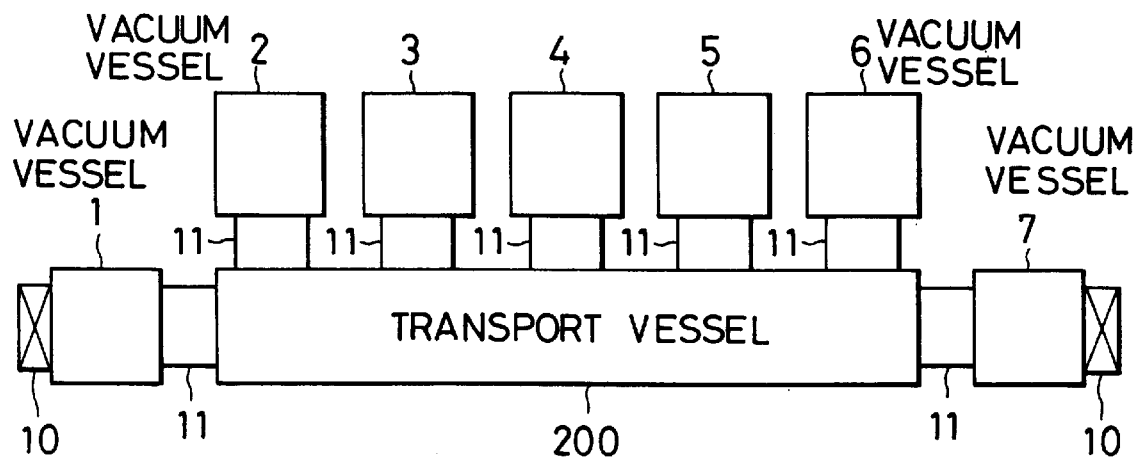
FIG. 2 is a schematic view showing the general configuration of a thin-film fabrication apparatus that is a second embodiment of the present invention.
Figure 3:
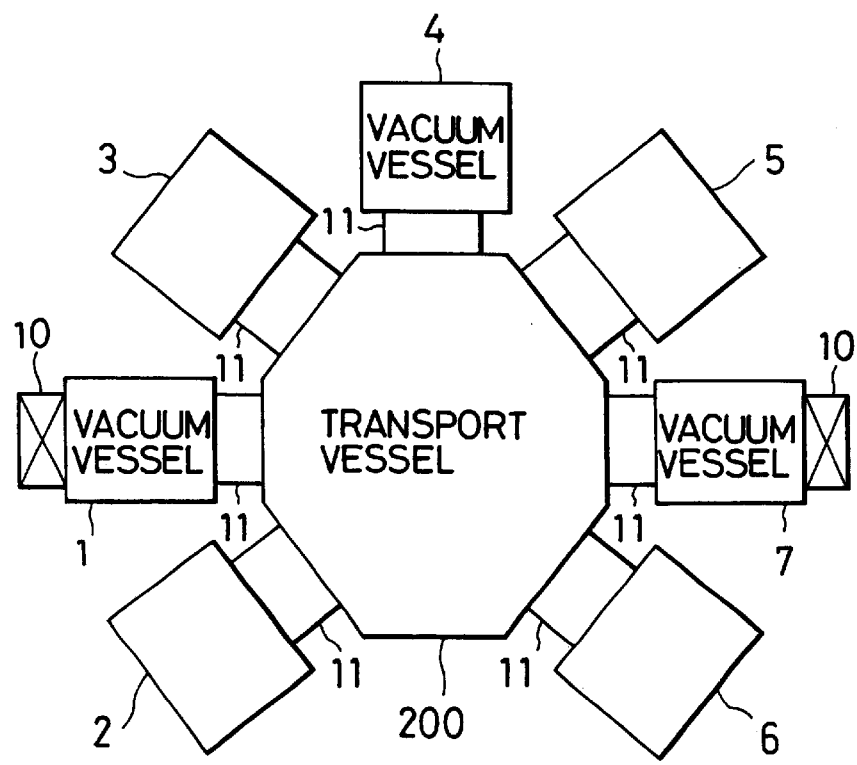
FIG. 3 is a schematic view showing the general configuration of a thin-film fabrication apparatus that is a third embodiment of the present invention.

FIG. 2 shows an apparatus according to a second embodiment of the invention, and FIG. 3 shows an apparatus according to a third embodiment of the invention. As shown in FIGS. 2 and 3, the vacuum vessels 1 to 7 may be arranged branching out from a transport vessel 200 to which the vacuum vessels are attached via the airtight doors 11, or may be arranged in a star-shaped configuration. If a process step is not required, such as the press-forming step, for example, the substrate can skip the vacuum vessel concerned (vacuum vessel 5 in the case of the press-forming step) and be transported to the next process.

Figure 4:
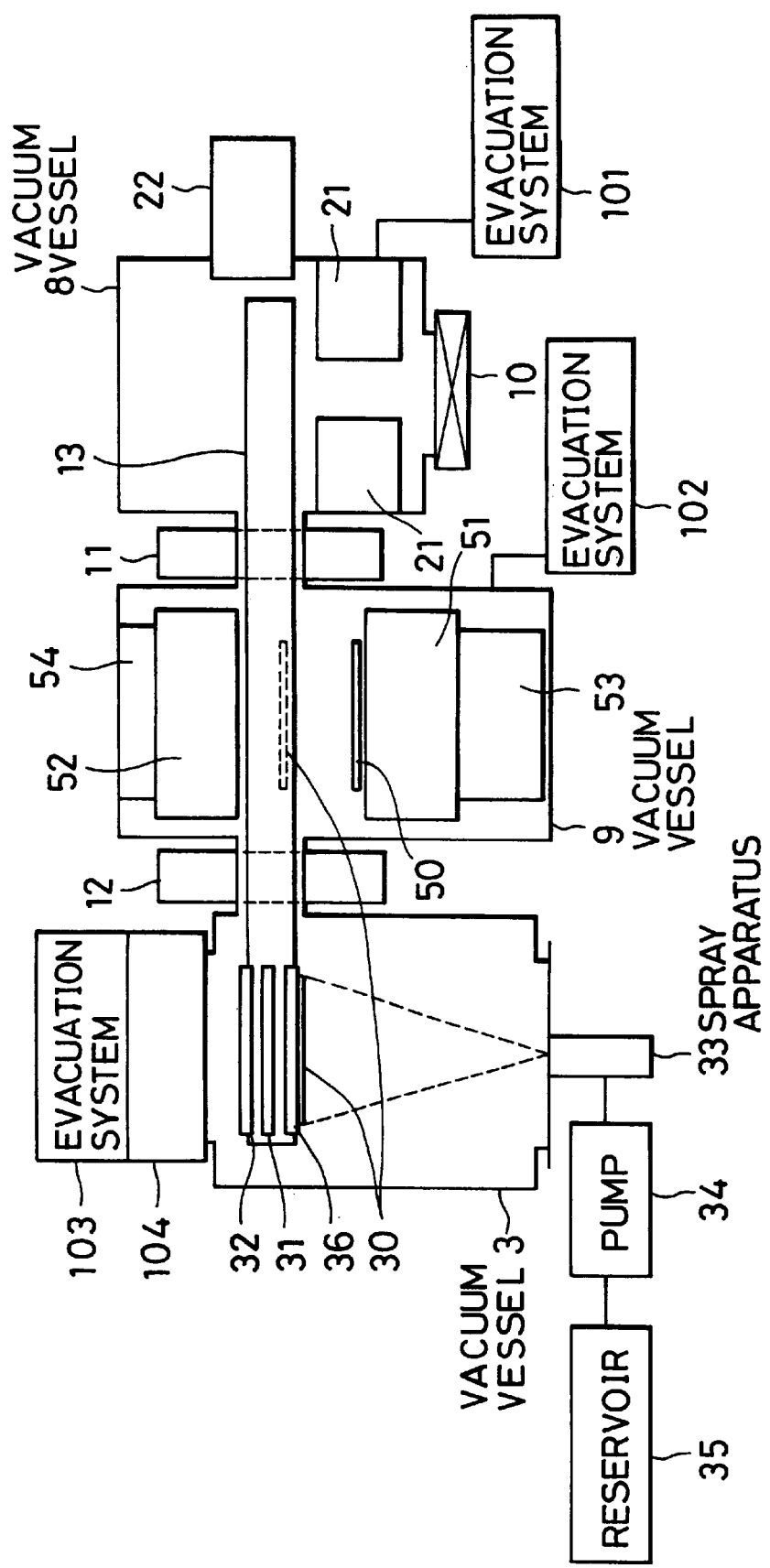
FIG. 4 is a schematic view showing the general configuration of a thin-film fabrication apparatus that is a fourth embodiment of the present invention.

FIG. 4 shows an apparatus according to a fourth embodiment of the invention, in which one vacuum vessel is used for more than one process. This enables the apparatus to be arranged in a more compact configuration. In the case of the configuration of FIG. 4, a general-purpose vacuum vessel 8 is used for substrate entry, substrate surface cleaning, sealing of the thin film, and thin-film exit, and a vacuum vessel 9 is used for heat-treating the thin-film composition material deposited on the substrate, and for the press-forming of the thin film. The apparatus configuration of FIG. 4 is for use in fabricating one thin film.

To reduce the burden on the evacuation system, it is preferable to arrange the vacuum vessels and other apparatus components with the aim of minimizing the volume of the vacuum system. It is preferable to form the vacuum vessels 1 to 9 of high-vacuum-specification aluminum or stainless-steel.

Each of the vacuum vessels 1 to 9 has a vacuum evacuation system. The ultimate vacuum and the rate of evacuation are set according to the process effected in the vacuum vessel concerned, and the best vacuum pump for the task is selected at the same time. For example, an ultimate vacuum of not more than $1\times10^{-4}$ Pa is desirable for an evacuation system 103 of the vacuum vessel 3 in which the thin-film composition material is sprayed. Furthermore, since the spraying process imposes a considerable burden on the system, it is preferable to use an evacuation rate that is not too high. As for the vacuum pump, it is recommended to use a pump combination such as a turbo molecular pump and a scroll pump. An ultimate vacuum of around $1\times10^{-6}$ Pa is desirable for an evacuation system 102 of the vacuum vessel 9 used for the heat-treatment and press-forming processes, but the evacuation rate does not need to be as high as that of the evacuation system 103. If the substrate surface is to be cleaned by electron-beam irradiation, an evacuation system 101 of the vacuum vessel 8 should have an ultimate vacuum of not more than $1\times10^{-6}$ Pa. A cold trap 104 is provided between the vacuum vessel 3 and the evacuation system 103 to trap the volatile solvent. The cold trap 104 can be cooled by liquid nitrogen or a helium freezer.

Each of the vacuum vessels 1 to 9 also has a pressure measurement apparatus (not shown). Any known measurement apparatus may be used that is able to measure accurately pressures of not more than $1\times10^{-2}$ Pa. A Bayard-Alpert ionization vacuum gauge, for example, may be used.

If the vacuum vessel 4 or 9 in which the thin-film composition material deposited on the substrate is heat-treated is provided with a mass spectrometer and an ionization apparatus in addition to the pressure measurement apparatus, the composition of the volatile solvent and other volatile components given off when the thin-film composition material deposited on the substrate is heat-treated can be examined. The ionization apparatus (not shown) is used to ionize volatile components present in the vacuum vessel. A known ionization apparatus may be used. Specific examples of an ionization apparatus that can be used include gas discharge, arc discharge and electron bombardment types. As the mass spectrometer (not shown), any known type can be used that is comprised of a mass separation system that separates the mass m of the ions generated by the ionization apparatus into a mass corresponding to a number m/e obtained by dividing the mass m by ion charge e, and a detection and recording system electrically tabulates the number of separated ions corresponding to m/e. The mass separation system controls the magnetic and/or electrical field to separate ions corresponding to m/e. There are parabolic types, velocity focusing types, directional focusing types, double-focusing types and flight-time types, any of which may be used. Detection and recording systems that can be used include types that are a combination of Faraday box and high-sensitivity direct-current amplifier, or a combination of secondary electron multiplier and high-sensitivity direct-current amplifier.

In the thin-film fabrication method according to the present invention, the substrate surface is cleaned in a clean, sealed vessel having no floating particles and/or contaminant gases and the substrate is placed in a vacuum vessel without exposure to the atmosphere, and at least one thin-film composition material in liquid form is sprayed into the vacuum vessel via a spray nozzle provided for each thin-film composition material, to form a deposition of the thin-film composition material on the substrate which is then heat treated. Either of the methods (1) and (2) described below can be used to enable the vacuum vessel 2 or vacuum vessel 8 to be used as the "clean, sealed vessel having no floating particles and/or contaminant gases."

(1) After insertion of the substrate, a high-vacuum state is created in the vacuum vessel 2 or 8 and the surface of the substrate is cleaned under the high-vacuum condition.

(2) After insertion of the substrate, nitrogen gas is introduced into the vacuum vessel 2 or 8 via a high-performance gas filter (for example, one that filters out 100% of microparticles of diameter 0.05 $\mu$m). Introducing the nitrogen gas after first creating a high vacuum in the vacuum vessel 2 or 8 facilitates efficient removal of floating particles and contaminant gases. The size and number of floating dust particles in the vacuum vessel 2 or 8 filled with nitrogen gas can be readily measured with a particle counter that utilizes light from a laser source scattered by the particles. In the implementation of the thin-film fabrication method of this invention, the number of floating dust particles of diameter 0.1 $\mu$m or larger per cubic foot is preferably less than 100; more preferably, a count of less than ten is recommended.

It is possible to form thin films under such low-dust-particle count conditions by using a film fabrication apparatus provided in a clean room or clean bench. However, it is necessary to use the clean, sealed vessel such as in the thin-film fabrication method of this invention in order to completely remove contaminant gases. "Contaminant gases" include oxygen molecules, water vapor, sulfur dioxide, nitrogen oxides, ethylene gas and terpenes given off by trees, ethanol vapor, acetoaldehyde vapor, acetic acid vapor, and aroma products and the like used in cosmetics and everyday miscellaneous goods. These contaminant gases can easily be analyzed by a gas chromatography apparatus. However, in order to analyze components in trace amounts, an air sampler has to be used to collect and concentrate the components.

Described below are examples of means used to clean the substrate surface in a clean, sealed vessel free of floating dust particles and/or contaminant gases.

Electron-beam Irradiation Method

When the substrate surface is irradiated under high vacuum by a beam of electrons emitted by an electron gun and accelerated by a voltage applied to a grid, contaminants adhering to or adsorbed on the substrate surface absorb the energy of the electron beam, which may be accompanied by a decomposition reaction, eliminating the contaminants by vaporization. This method is suitable when the substrate material is electrically conductive or is covered with a conductive material. The cleanliness of the substrate surface can be monitored by using a mass spectrometer to count the ions generated by the electron-beam irradiation.

Ion-beam Irradiation Method

Under a high vacuum, an inert gas such as argon or a reactive gas such as fluorine compound gas is introduced to an ion source in a vacuum vessel. This ionizes the gas, and the ions emitted by an ion gun are accelerated by application of a voltage to the grid of the gun, forming an ion beam that is used to irradiate the substrate surface. Contaminants adhering to or adsorbed on the substrate surface absorb the energy of the ion beam, which may be accompanied by a decomposition reaction, eliminating the contaminants by vaporization. Electron-beam irradiation can be used in combination with ion-beam irradiation, which allows the surface of substrates formed of non-conductive substances to be cleaned without charging the substrate.

Plasma or Reactive Ion Etching Method

Developed as a technology for forming fine patterns on semiconductors, the so-called dry etching technique is used to etch away the substrate surface layer to a uniform depth, thereby also removing contaminants. For example, a reactive gas is introduced into the vacuum vessel while at the same time a high-frequency glow discharge is used to generate reactive ions (plasma) and neutral radicals which are applied to the substrate placed on the cathode plate. In addition to the bombardment of accelerated ions, a reaction with the highly reactive neutral radicals takes place, enabling anisotropic etching in a direction that is perpendicular (depthwise) to the substrate surface (reactive ion etching). Using just the reaction produced by the neutral radicals with no ion acceleration enables isotropic etching of the entire substrate surface (plasma etching). A uniform effect can be achieved relative to the substrate by attaching a permanent magnet to a round plate, arranging the plate facing the substrate and rotating the plate, thereby stirring the plasma. When the substrate is formed of metal or optical glass, since products of the reaction with the substrate material generally become volatile gas, fluorine compound gas (such as sulfur hexafluoride or hexafluoroethylene, for example) can be used as the reactive gas. When the substrate is an organic compound such as a polyimide , oxygen can be used as the reactive gas.

Ultraviolet Irradiation Method

When the surface of a substrate in a clean, sealed vessel free of floating dust particles and/or contaminant gases is irradiated with ultraviolet light (preferably with a wavelength of 200 to 300 nm), photo-ionization and ultraviolet decomposition of organic contaminants adhering to or adsorbed on the substrate surface are promoted. This method is effectively used in conjunction with the ozonization method described below.

Ozonization Method

Ozone is produced when oxygen gas is irradiated with ultraviolet light (preferably of wavelength 185 nm). This ozone produces oxidation decomposition of organic contaminants adhering to or adsorbed on the substrate surface, which are eliminated as volatile oxidation products. Ozone can be efficiently produced by affixing an ultraviolet lamp (with an output of 5 to 20 W) in the sealed vessel and elevating the oxygen partial pressure in the sealed vessel to above the usual level. If an atmosphere of pure oxygen is used, care must be taken to confirm that the sealed vessel contains no O-rings, oil, grease or other such flammable substances. Failure to do so can result in the formation of explosive superoxide.

In the case of the arrangement of the first example described below, a substrate cleaning structure 21 is used comprising two 5 W ultraviolet lamps of center frequency 185 nm, and two 5 W ultraviolet lamps of center frequency 254 nm, affixed within the vacuum vessel 8 so as to irradiate the surface of the substrate. After insertion of the substrate from the inlet 10, the interior of the vacuum vessel 8 is filled to atmospheric pressure with clean nitrogen gas passed through a gas filter that filters out 100% of particles 0.05 $\mu$m in diameter, and the atmosphere is cleaned until no floating dust particles (0.1 $\mu$m in diameter or larger) or contaminant gas is detected in the interior. Oxygen gas is then introduced via a gas filter that filters out 100% of particles 0.05 $\mu$m in diameter. After the oxygen concentration has been raised to not less than 60%, the ultraviolet lamps are switched on and the substrate surface irradiated with ultraviolet light for one hour and subjected to ozonization. After this cleaning treatment, the interior of the vacuum vessel 8 is evacuated to a high vacuum of not more than $10^{-4}$ Pa, airtight doors 11 and 12 are opened in order, and substrate transport structure 13 is used to transport substrate 30 via vacuum vessel 9 in which the high vacuum state is maintained, to vacuum vessel 3, in which a high vacuum state is maintained for the vacuum spraying process. Since the substrate, following cleaning of the substrate surface in the vacuum vessel 8, is transported to the spray process, without exposure to the outside air, in the high vacuum that is maintained within, the thin film is fabricated on the clean substrate, resulting in a thin film that is durable, with a high-strength bond to the substrate.

As the airtight doors 11 and 12 used to temporarily shut the connection between the vacuum vessels, there can be used gate valves having an opening large enough to allow passage of the substrate and substrate transport structure 13.

The substrate transport structure 13 may be any structure that does not interfere with the opening or closing of the airtight doors 11 and 12. A magnetic coupling may be utilized to allow the substrate to be moved from outside the vacuum vessels. Needless to say, the structure used has to be one in which dust particles are not produced by parts that operate mechanically.

If required, the substrate 30 can be bonded to a support 36 to facilitate handling of the substrate 30 for transportation by the substrate transport structure 13. Particularly when a glass substrate is used, it is preferable to affix the substrate to a metal support 36 for transportation within the vacuum vessels. In the example configuration, the glass substrate conveyed into the vacuum vessel was first bonded to a support 36 and the surface (on which the thin film is to be fabricated) was then cleaned by ozonization.

The vacuum vessel 3 used for the spraying process is connected to the evacuation system 103 via the cold trap 104, enabling the vacuum in vacuum vessel 3 to be maintained during the spraying process. The substrate 30 transported into the vacuum vessel 3 by the substrate transport structure 13 is attached to a substrate heating structure 31 that is attached to a moving structure 32 used for parallel and rotational movement of the substrate. During the spray process, the substrate 30 placed in a high vacuum is heated to a prescribed temperature by the substrate heating structure 31, as described in detail below, and as such is an important structural element of the thin-film fabrication apparatus of the invention. The type of heating system used by the substrate heating structure 31 can be selected from among electrical heating, heating by visible light and/or infrared light, and induction current heating, the actual choice depending on the substrate material and the presence or absence of a substrate support 36. It needs to be kept in mind that the substrate is heated in a high vacuum, which acts as a heat insulator. That is, there will be no air to conduct any heat across any space that exists between heat source and the substrate and/or the substrate support, in which case the substrate would be heated only by the heat carried by infrared rays. It would be highly inefficient to use infrared light beamed across a gap to heat a substrate formed of glass or other such material having a high transmissivity to infrared light, or a substrate formed of a material such as aluminum that has a high reflectivity to infrared light, and would be a hindrance to controlling the substrate temperature within the control temperature range. The present inventors discovered that this problem could be avoided by using the method described below.

(1) The substrate temperature can be controlled within the control temperature range by providing the substrate with a removable conductive exothermic film on the side opposite the surface on which the thin film is fabricated and passing electricity through the conductive exothermic film to heat the film. After the thin film has been formed, the conductive exothermic film is removed by peeling, by washing, or by etching or other such means. The removable conductive exothermic film may be a foil tape of aluminum, copper, stainless-steel or other such metal foil coated with pressure sensitive adhesive; a metal paste type coating film formed of particles of a precious metal such as gold or silver dispersed in a binder resin and/or a solution; or a tape formed by coating a metallic paste on an organic high-molecular film-based pressure sensitive adhesive tape. However, any pressure sensitive adhesive, metal foil, binder resin and the like has to be able to withstand the temperatures to which the substrate is heated, and exhibit low emission of volatile components when heated in a high vacuum. It is also possible to use vacuum deposition to form a conductive exothermic metal film pattern on one surface of the substrate.

Figure 6:
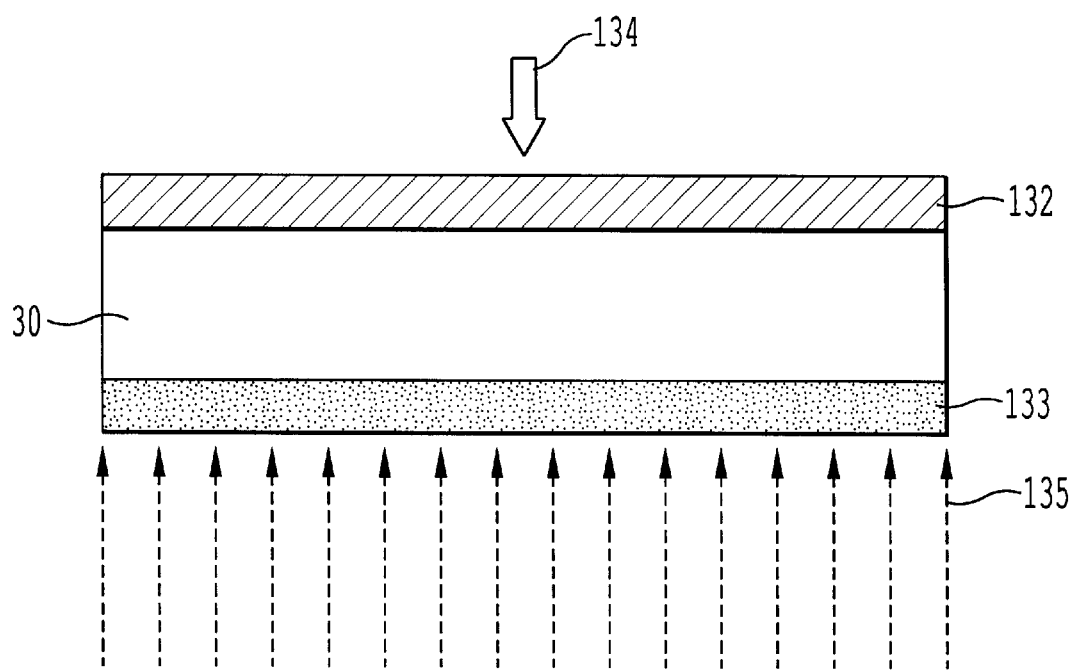
FIG. 6 is an explanatory view showing the substrate heated by light and radiation in the thin film fabrication apparatus of FIG. 4.

(2) The substrate temperature can be controlled within the control temperature range by providing the substrate 30 with a removable visible light and/or infrared absorbing film 132 on the side opposite the surface on which the thin film 133 is fabricated and heating the visible light and/or infrared absorbing film 132 by irradiating it with light 134 having a wavelength within the wavelength absorption band of the film, as shown in FIG. 6. In FIG. 6, reference numeral 135 denotes a sprayed thin film composition material. After the thin film has been formed, the visible light and/or infrared absorbing film is removed by peeling, by washing, or by etching or other such means. The removable visible light and/or infrared absorbing film may be a pressure sensitive adhesive tape constituted by a heat-resistant resin film having a carbon-black-containing coating as the visible light and/or infrared absorbing coloring matter. Any material that is used has to be able to withstand the temperatures to which the substrate is heated, and exhibit low emission of volatile components when heated in a high vacuum.

(3) The substrate temperature can be controlled within the control temperature range by providing the substrate with a removable conductive magnetic film on the side opposite the surface on which the thin film is fabricated and heating the conductive magnetic film by eddy current produced by irradiating the conductive magnetic film with electromagnetic waves from an induction coil. After the thin film has been formed, the conductive magnetic film is removed by peeling, by washing, or by etching or other such means. As the removable conductive magnetic film, there may be used, for example, heat-resistant resin film on which magnetic stainless-steel foil is laminated, or pressure sensitive adhesive tape formed by coating magnetic stainless-steel foil with a pressure sensitive adhesive.

(4) To control the substrate temperature within the control temperature range, a non-volatile liquid or fluid is used to adhere the substrate to the substrate support 36 and the substrate support 36 is heated electrically, or by visible light and/or infrared irradiation, or by induction current. After the thin film has been formed, the liquid or fluid is removed by washing or other such method. The non-volatile liquid or fluid used to conduct heat between the substrate and the substrate support should have low component volatility, and care should be taken with respect to the quantity used to ensure that the thin film is not contaminated by a heat-resistant silicone grease, silicone oil, fluoroplastic-based grease or the like. To avoid contamination of a fabricated film, it is also preferable to remove such grease and oil after the thin film has been sealed as described below.

(5) To control the substrate temperature within the control temperature range, a rubber-like resilient substance is used to adhere the substrate to the substrate support and the substrate support is heated electrically, or by visible light and/or infrared irradiation, or by induction current. Low-volatility, heat-resistant silicone rubber and modified fluoroplastic silicone rubber are examples of materials that can be used as the rubber-like resilient substance used to conduct heat between the substrate and the substrate support. To ensure efficient transfer of heat from the substrate support to the substrate, such rubber-like heat insulators should be as thin as possible. Heat-resistant silicone rubber sheet containing embedded electrical exothermic elements can also be used, as well as rubber sheet into which conductive carbon black has been kneaded to impart electrical exothermic properties. The substrate support can be heated by sheathed heaters designed for operation under high vacuum conditions, with the heaters inserted in holes in the substrate support and high-vacuum-specification heat-resistant grease or oil used as a heat-transfer agent. Or, visible light and/or infrared absorbing film can be coated or adhered to the underside of the substrate support (the surface on the side opposite to the surface to which the substrate is attached) and the support heated by visible light and/or infrared irradiation from a source inside or outside the vacuum vessel. Iron or magnetic stainless-steel can be used to form the substrate support, and the support heated by induction current heating using an electromagnetic induction coil provided in the vicinity of the support.

With respect to the implementation of the substrate heating methods described above, it is recommended that any heating method is first tested to confirm that under high vacuum conditions the heating means and heat-transfer agent used does not give rise to contamination caused by volatile components. Details of methods of testing for volatile components produced when organic materials are heated in a high vacuum can be found in, for example, JP-A-6-202179.

In the arrangement of the first example of the invention, the substrate support 36 is an aluminum plate 100 $\mu$m thick, 36 mm wide and 100 mm long. One surface of the aluminum plate was provided with an infrared radiation absorbing film formed by applying a silicone resin based heat-resistant coating containing carbon black, the other surface was coated with silicone grease marketed as a heat-transfer grease for semiconductor cooling applications, a glass substrate was adhered, and a thin film was fabricated.

The substrate temperature can be regulated by a temperature sensor (not shown) and a heat control apparatus (not shown) for the substrate heating structure 31. It is important to position the temperature sensor pickup in close contact with the substrate.

The structure 32 effects turning and parallel motion of the substrate, and during the vacuum spray process is used to adjust the position of a spray nozzle 300 (FIG. 5) of the vacuum spray apparatus 33 relative to the substrate, using a magnetic coupling or suchlike arrangement to provide control from outside the vacuum vessel 3, in order to adjust the thickness distribution of the fabricated thin film. The thickness of the thin film can also be controlled by a shutter plate (not shown) provided between the spray nozzle 300 and the substrate 30.

The thin-film composition liquid is stored in a reservoir 35 from which it is pumped by a pump 34 to the spray apparatus 33 and out through the spray nozzle 300. As disclosed in detail in JP-A-7-252671, providing a plurality of sets of the reservoir 35, pump 34, spray apparatus 33 and spray nozzle 300 enables a high level of control to be applied to the composition of the thin film that is fabricated. However, the arrangement of this example is described below with reference to the use of just one set of reservoir 35, pump 34, spray apparatus 33 and spray nozzle 300.

Figure 5:
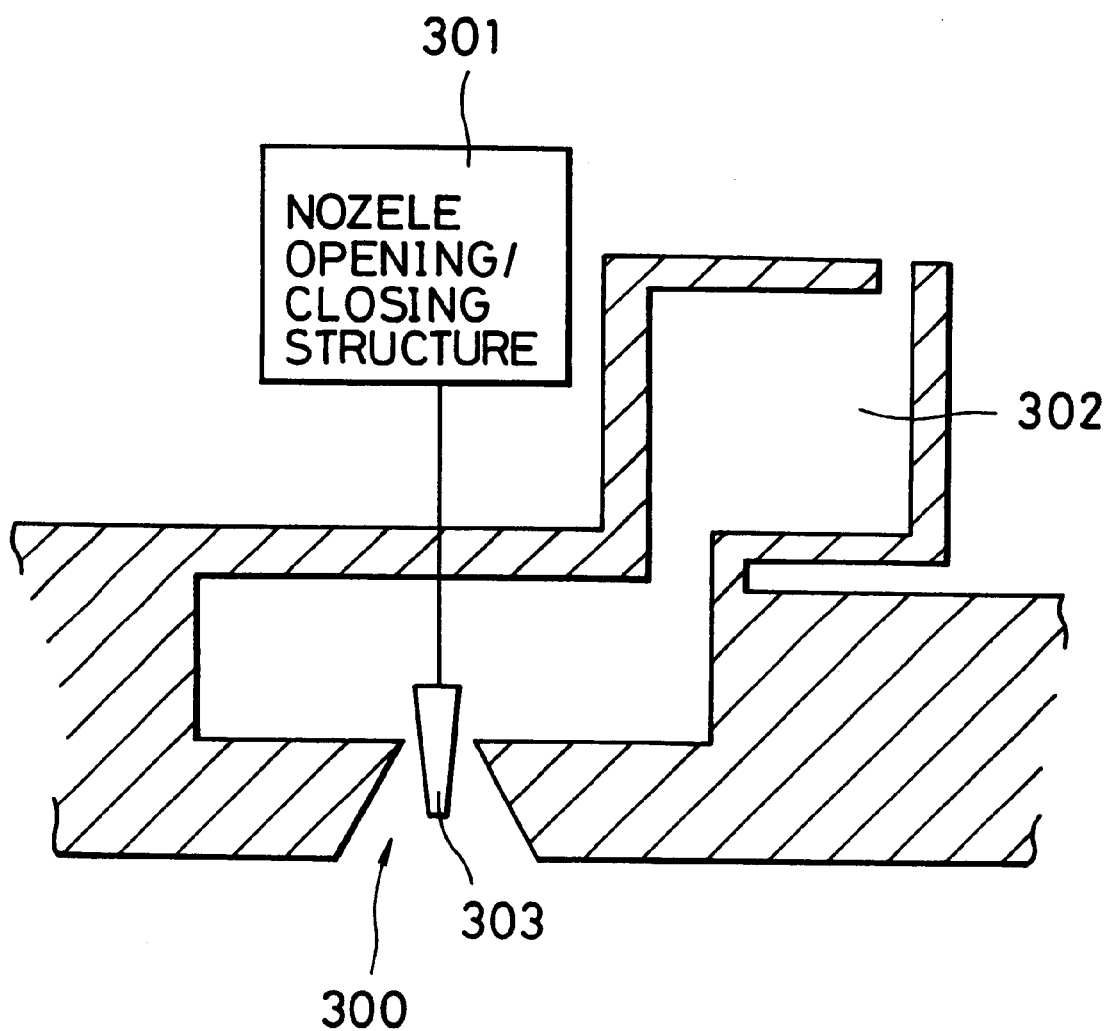
FIG. 5 is a cross-sectional view of a spray nozzle and nozzle opening and closing structure used in the invention.

As described in detail by JP-A-6-306181, a high-precision-machined needle valve can be utilized for the spray nozzle 300, shown in cross-section in FIG. 5. More specifically, the spray nozzle 300 is provided with a needle valve 303 that is moved by a nozzle opening/closing structure 301 to adjust the flow rate of the thin-film composition solution or dispersion being sprayed from the spray nozzle 300, preventing closure thereof. The pump 34 pumps the thin-film composition solution or dispersion to the spray nozzle 300, via spray liquid flow path 302.

A high-pressure liquid-chromatography pump can be used as the pump 34.

The example will be described with reference to a thin-film composition material in the form of a liquid constituted by a solution formed by dissolving fluorescent organic coloring matter of 3,3'-diethyloxa-dicarbocyanine iodide (hereinafter abbreviated to "DODCI") and thermoplastic resin of poly-2-hydroxypropyl methacrylate (hereinafter abbreviated to "PHPMA") in acetone. DODCI produced by the U.S. company Exciton Inc. was used. Being an ionic crystal, this coloring matter did not exhibit a melting point but decomposed when heated in a nitrogen atmosphere to approximately 230° C. at 10° C./min, and did not sublimate even when heated to 150° C. under a high vacuum of $10^{-5}$ Pa. PHPMA made by the U.S. company Scientific Polymer Products Inc. was used, after being refined by the reprecipitation method. The resin had a glass transition temperature of 73° C. The composition of the thin-film formation liquid material was set at 24.32 mg ($5.00 \times 10^{-5}$ mol) of DODCI and 5.03 g of PHPMA in 1,000 ml of acetone. The melting initiation temperature of the coloring matter/resin component composition was pretested by the method described below.

The thermal behavior of the composition containing the thermoplastic high-molecular compound deposited on the substrate in the vacuum spraying process was presumed to be similar to that of the coprecipitation powder prepared by the method described by JP-A-6-263885. However, differential thermal analysis of this type of composition containing a thermoplastic high-molecular compound revealed that the effect of baseline variation arising from enthalpy easing was considerable, making it difficult to discern the melting initiation temperature. The following test methods can be used to determine the melting initiation temperature of thin-film composition material that includes components containing thermoplastic high-molecular compounds.

Test Method (1):

Several tens of milligrams of a powdered specimen of a composition containing the thermoplastic high-molecular compounds prepared by the method described by JP-A-6-263885 is passed through a 60-mesh screen, and sandwiched between two cover glasses clamped together by a pair of paper clips, one at each end of the cover glasses. This is then placed in a blow drier (a Model DK400 made by Yamato Scientific Co., Ltd., for example) at atmospheric pressure set at the test temperature (for example 150° C.), removed after 10 minutes, and the powder inspected to check for melting or deformation. If the powder is completely melted in the first test, the temperature setting is reduced by 20° C., for example, and the test is repeated. If a portion of the powder is melted, the temperature is again reduced by 20° C. If no external deformation is observed, measurements are repeated while raising the temperature of the drier in increments of 5° C., for example, to establish the temperature at which some of the powder starts to melt, which is taken as being the melting initiation temperature. This method can be used to find a melting initiation temperature up to 250° C.

Test Method (2):

Based on the melting point measurement method used in the Japan Pharmaceutical Law, a glass capillary tube sealed at one end was charged with several milligrams of a powdered resin, forming the test sample, that had been passed through a 60-mesh screen, heated at a constant rate, such as 1° C./min, in a water bath, and the degree of melting visually inspected through a magnifying glass. Generally the powder appears to become moistened, followed by a decrease in volume, partial transparency, and finally, complete decomposition. The temperature at which the partial transparency occurs is taken as being the melting initiation temperature. Instead of a glass capillary tube, the powder can be placed between two cover glasses, heated and inspected by microscope. If the test is conducted in open air and the sample is one that is prone to heat decomposition from the effect of oxygen and the like, the part of the process up to the charging of the glass capillary tube can be done in a glove box filled with inert gas. After the glass capillary tube is sealed with epoxy resin or the like, it can be taken out into the air and subjected to the rest of the test procedure. Test method (1) is more suitable for dark-colored coloring matter/resin, being easier to observe in the powdered state.

By using the test method (1), the melting initiation temperature of the coloring matter/resin of the above composition was determined to be 140° C. Among the components of the composition, DODCI had the lowest decomposition initiation temperature (230° C., measured under the above-described conditions). Thus, 150° C. to 180° C. was set as the range in which the substrate heating temperature was to be controlled for the thin-film fabrication by the arrangement of this example.

The substrate support 36 was an aluminum plate 100 μm thick, 36 mm wide and 100 mm long. One surface of the aluminum plate was provided with an infrared radiation absorbing film formed by applying a silicone resin based heat-resistant coating containing carbon black. The other surface was coated with silicone grease marketed as a heat-transfer grease for semiconductor cooling applications, which was used to adhere a substrate 30 of hard glass measuring 30 mm by 30 mm by 150 μm thick. After being cleaned in the clean, sealed vessel, while being maintained in a high vacuum, the substrate was attached to the infrared-radiation-based substrate heating structure 31 of the vacuum vessel 3 used for the vacuum spraying process. While regulating the substrate temperature within the range of 150° C. to 180° C., and under a vacuum of $10^{-4}$ Pa, the thin-film composition liquid was sprayed from the spray nozzle 300 to effect the deposition of the thin-film composition material (a mixture of DODCI and PHPMA; when the specific gravity of the PHPMA is 1.06, the DODCI has a concentration of 0.01 mol/l) on the substrate. During the spraying process, a microheater (not shown) was used to heat the nozzle region to around 40° C., replenishing the acetone evaporation heat and preventing acetone from freezing in the spray nozzle.

After completion of the spraying process, the substrate 30 remained in the vacuum vessel 3, where it continued to be heat-treated by infrared irradiation, via the substrate support 36, to keep the substrate in the above temperature range (150° C. to 180° C.), and a vacuum of not more than $10^{-4}$ Pa, until diffusion of volatile components from the deposition on the substrate was no longer observed. During this time, the progress of the heat treatment process was monitored by using an ionization apparatus (not shown) and a mass spectrometer (also not shown) to analyze components evaporating from the deposition. At the beginning of the heat treatment process, small quantities of ions reverting to the solvent (acetone, in this case) used in the spray process were detected.

After continuing to heat the substrate for 30 minutes at a temperature within the above range and in a vacuum of not more than $10^{-4}$ Pa, to complete fabrication of the thin film of example 1, the substrate, still in the high vacuum, was cooled to room temperature and then removed into the open air, omitting the press-forming process. Preliminary film formation experiments were carried out beforehand to determine film formation conditions. Based on the results, the spray velocity and spray time were regulated to achieve a post-heat-treatment thin-film thickness of 2 μm. Ten thin films were fabricated by the procedure of example 1.

To test the strength of the adhesion between the substrate and the thin film, a peel test was conducted using pressure sensitive tape (cellophane tape). The test was conducted using heat-transfer grease to adhere each of the substrates to the substrate support 36. This was done since, as the thin films of this example were not sealed there was a risk of the thin film being contaminated when cleaning the underside of grease, preventing the proper implementation of the adhesion strength test.

Ten cuts were made in the thin film on the substrate, each cut one millimeter away from the next, using the type of cutter blade that is snapped off in sections to replace a used blade section with an one. Another series of ten cuts at one millimeter intervals was then made at right-angles to the first cuts, forming 100 squares of thin film, each one millimeter square. A new blade section was used for each cut. Pressure sensitive tape was then applied to the 100 thin film squares, using tape 18 mm wide to ensure that all the thin film pieces were covered. The tape was then peeled off, and the number of thin film squares that had peeled off the substrate and stuck to the tape were counted. This test was repeated on the ten thin films. No peeling of thin film pieces was observed. This meant that in accordance with the method embodied by this example, thin films could be fabricated having a very high strength of adhesion.

EXAMPLE 2

Except that the substrate temperature during the spraying process was maintained at 40° C., the same procedure as in example 1 was followed to fabricate ten thin films, with the temperature during the substrate heating process being maintained in the range 150° C. to 180° C. for 30 minutes and no press-forming process being used. The ten thin films were subjected to the same peel test used in example 1. The number of peeled pieces averaged 1.2 per substrate. While this is slightly inferior to the result obtained with respect to example 1, it shows that it was possible to fabricate thin films having fully adequate adhesive strength.

COMPARATIVE EXAMPLE 1

Substrates were used concerning which the substrate surface was only subjected to the application of a dichromic acid solution of sulfuric acid to remove by oxidation organic contaminants adhering to the surface, after which the surface was washed with ultrapure water, then was given a final wash with ethanol, and the surface dried by vaporizing the ethanol. Ten thin films were then prepared in the same way as in example 2, except for the absence of an ozonization process, and the same peel test used in example 1 was carried out. The number of thin film pieces that peeled off during the test averaged 83 per substrate, meaning that the area of film that peeled off was larger than the area of film that did not peel off. This reveals that the difference is rooted in the presence or absence of an ozonization process. It can be assumed that unless the substrate surface is cleaned in a clean, sealed vessel, contaminating substances will remain on the substrate surface, degrading the strength of the thin-film adhesion.

COMPARATIVE EXAMPLE 2

Substrates were subjected to surface cleaning by ozonization, as in example 1, then removed from the apparatus and left for one night in a clean bench (less than 100 floating dust particles of diameter 0.3 $\mu$m or larger per cubic foot). With the exception that these substrates were used, ten thin films were prepared by the same procedure used in example 1, and were subjected to the same peel test. On average, the number of thin film pieces that peeled off during the test was 2.6 per substrate, meaning that compared to example 1, the thin film peeled off more readily. It can be inferred that this was because, with the heightened adsorption activity of the substrate surface subjected to the cleaning, contaminant gases were adsorbed even when the substrate was just left in the clean bench, degrading the strength of the thin-film adhesion.

EXAMPLE 3

As in example 1, substrate 30 on which thin-film composition material (a mixture of DODCI and PHPMA) was deposited was heated by infrared radiation within the range of 150° C. to 180° C. while remaining in the vacuum vessel 3, and this was continued until diffusion of volatile components stopped. The substrate 30 with the deposited thin-film composition material was then moved, with the vacuum state preserved, to the vacuum vessel 9 for the press-forming process.

The interior of the vacuum vessel 9 is provided with anvils 51 and 52 with built-in electrical exothermic elements, and presses 53 and 54. As the anvils 51 and 52, there may be used nickel-plated steel anvils containing embedded sheathed heaters having in-vacuum heating specifications, that can regulate temperatures up to 250° C., for example, by means of temperature sensors (not shown) and an electrical heating power supply with a temperature regulator (not shown). The presses 53 and 54 may, for example, be operated by a plurality of interlocked fine-motion screws (not shown) that via a magnetic coupling can be rotated from outside the vacuum vessel to effect press-forming of a thin-film composition deposition placed between the anvils 51 and 52.

After a substrate 30 on which the thin-film composition material has been deposited is attached to anvil 52, a second substrate 50 is positioned in the vacuum vessel 8 and the surface of the substrate cleaned by ozonization. Under high vacuum, the substrate 50 is attached to the anvil 51 in the vacuum vessel 9. The position of the substrate 50 is adjusted so that it is exactly opposite the substrate 30 attached to the anvil 52.

Next, to bring the substrates 30 and 50 together under a vacuum of not more than $10^{-4}$ Pa, the presses 53 and 54 are operated and at the same time the built-in heaters are used to control the temperature of the anvils within the prescribed range (150° C. to 180° C.). In line with the progress of the melting and flowing of the thin-film composition material deposition on the substrate 30, the presses 53 and 54 are subjected to fine adjustment to bring the substrates 30 and 50 closer together, press-forming the deposited thin-film composition material. After maintaining the anvil temperature within the above range for 30 minutes, it is cooled to room temperature and the formed thin film, sandwiched between the substrates 30 and 50, is transported to the vacuum vessel 8, the interior of which is returned to atmospheric pressure by introducing clean nitrogen gas.

At this point, a sealing structure 22 attached to the vacuum vessel 8 is operated to seal the periphery (edges) of the thin film sandwiched between the substrates 30 and 50 with epoxy resin, sealing the thin film. The sealing structure 22 may be in the form of a glove-box arrangement having gate valves that are closed when a vacuum is being used, and have rubber gloves attached thereto to enable the sealing operation to be done manually. Alternatively, the sealing structure 22 may be comprised of an epoxy resin injection syringe operated from the outside by a manipulator. By making it possible to perform the sealing operation under high vacuum conditions, this would provide a further enhancement of the sealing effect.

In this example, the spray velocity and spray time used in the spraying process were regulated to control the thickness of the thin film formed between the substrates 30 and 50 to a thickness of 10 $\mu$m.

After completion of the sealing process, the thin film was taken out of the apparatus, the substrate support was peeled off, and adhering grease removed using a wiper impregnated with a solvent.

The thin film of example 2 thus fabricated (sealed in by two pieces of optical glass and epoxy resin) was kept for two years in a dark place at room temperature. Every six months the absorption spectrum of the thin film was measured, and showed no change over the two-year period.

COMPARATIVE EXAMPLE 3

In the same procedure used in example 2, a thin film was fabricated sandwiched between substrates 30 and 50, but unlike example 2, was taken out into the air without the edges being sealed with epoxy resin. Thus, although the thin film of comparative example 3 was sandwiched between two pieces of optical glass, the edges were in contact with the air. The thin film was kept for two years in a dark place at room temperature. After one year, it was visually observed that the coloring matter had started to fade, starting from the edge portions in contact with the air. After a year and a half, this fading was confirmed by the absorption spectrum. DODCI decomposes in the presence of oxygen and water, and not sealing the edges allows entry of oxygen and water that decompose the coloring matter. When the thin film of example 1 (having one surface in full contact with the air) was placed in a dark place at room temperature, after several months the coloring matter started to fade, and after two years very little remained.

COMPARATIVE EXAMPLE 4

As in example 2, a thin film was fabricated sandwiched between substrates 30 and 50, but unlike example 2 was taken out into the air without the edges being sealed with epoxy resin. Up to this point comparative example 4 is the same as comparative example 3. Next, however, the edges were sealed with epoxy resin in the atmosphere, and the thin film thus fabricated was kept for two years in a dark place at room temperature. Although the exposure to the air was short, after a year and a half, the coloring matter had started to fade slightly, from the edge portions that had been in contact with the air. To heighten the effectiveness of the sealing process, it must be done under inert gas conditions, as described with reference to example 2.

EXAMPLE 4

In accordance with the general procedure, a vacuum spray liquid was prepared using tetraethoxysilane, ethanol, water, and as an acid catalyst, a small quantity of acid ion exchange resin particles to form a sol solution that was stirred for 24 hours at room temperature, advancing hydrolysis and condensation polymerization reactions, and to finish, the ion exchange resin particles were removed and a styrile-based fluorescent whitening agent dissolved in. Coating this liquid on a substrate by a normal method and heating it to 100° C. enables a transparent thin film to be obtained by the sol/gel method. Thus, the substrate temperature during the spraying and heating processes was controlled to 100° C. to form a film by the vacuum spray method. The heat treatment following the spraying was continued until diffusion of volatile components from the substrate was no longer observed. As in example 1, the substrate was a glass substrate measuring 30 mm by 30 mm by 150 $\mu$m thick, which was adhered to the substrate support using grease. Ozonization was used to clean the substrate surface. As in example 1, during the spraying and heating processes, the substrate was heated by infrared radiation of the substrate support. The spray velocity and spray time were adjusted to produce a thin film having a thickness of 0.2 $\mu$m. Ten of these thin films were fabricated, and subjected to a peel test, which produced no peeling. The absence of peeling was confirmed by observation in the dark while the film was irradiated by ultraviolet light to activate the added fluorescent whitening agent.

COMPARATIVE EXAMPLE 5

Ten thin films were fabricated by the same method used in example 4, except for the omission of the ozonization cleaning step. A peel test was conducted, resulting in an average of 27 peeled pieces per substrate.

EXAMPLE 5

The vacuum spray method was used to form a film from an N,N-dimethylformamide solution of polyamic acid that includes a merocyanine coloring matter in a high-polymer chain structure disclosed in JP-A-8-95101. A polyimide film can be formed by applying a coating of this polyamic acid, heating it for one hour at 100° C. and then at 250° C. for one hour. No decomposition was observed even when the film was heated to 300° C. Thus, thin-film formation by the vacuum spray method was effected with the substrate temperature during the film forming process being controlled within the range of 150° C. to 180° C., followed by the substrate temperature being controlled within the range 250° C. to 260° C. during the heat-treatment process. The heat treatment following the spraying was continued until diffusion of volatile components from the substrate was no longer observed. As in example 1, the substrate was a glass substrate measuring 30 mm by 30 mm by 150 $\mu$m thick, which was adhered to the substrate support using grease. Ozonization was used to clean the substrate surface. As in example 1, during the spraying and heating processes, the substrate was heated by infrared radiation of the substrate support. The spray velocity and spray time were adjusted to produce a thin film having a thickness of 1.5 $\mu$m. Ten of these thin films were fabricated, and subjected to a peel test, which produced no peeling.

As described in the foregoing, the thin-film fabrication method and apparatus of the present invention enables thin films to be fabricated without being affected by contaminants, thereby enabling the efficient production of thin films having strong adhesion to the substrate and high durability.

What is claim is:

1. A thin-film fabrication apparatus comprising:

a vacuum vessel;

at least one spray nozzle provided within the vacuum vessel for each thin-film composition material that is to be sprayed;

a substrate having a surface on which the thin-film composition material is deposited;

measuring means for measuring a substrate temperature;

heating means for heating the substrate;

control means for controlling the heating means;

evacuation means for evacuating the vacuum vessel; and a removable exothermic film provided on another surface of the substrate opposite the surface on which the thin-film composition material is deposited;

said control means controlling the heating means to heat the substrate within a control temperature range having a lower limited defined as a temperature that exceeds a lowest temperature of a group of temperatures (1) to (3) selected depending on constituent components of the thin-film composition material used, and an upper limit defined at a temperature that does not exceed a lowest heat decomposition initiation temperature of said thin film composition material components, said group of temperatures being:

(1) in the case of a thin-film composition material that includes a component containing a thermoplastic high-molecular compound, a melt initiation temperature of the component containing the thermoplastic high-molecular compound, (2) in the case of a thin-film composition material that contains an organic or inorganic high-molecular compound precursor, a polymerization initiation temperature, and (3) in the case of a thin-film composition material that contains an organic or inorganic cross-linking agent or bridged compound, a temperature at which a cross-linking reaction is initiated.

2. The thin-film fabrication apparatus according to claim 1, further comprising means for cleaning a surface of the substrate prior to the composition material being sprayed, said cleaning means being provided in a clean, sealed vessel having neither floating particles nor contaminant gases, said sealed vessel being provided within the vacuum vessel or connected with the vacuum vessel via an airtight door.

3. The thin-film fabrication apparatus according to claim 2, wherein the apparatus comprises at least two vessels connected by a transport chamber equipped with airtight doors to each vessel, wherein at least one of the at least two vessels is used as a substrate pretreatment vessel for which it has the cleaning means, transportation means for transporting the substrate into a remaining one of the at least two vessels and the evacuation means, and wherein at least one of the at least two vessels is used as a vacuum spray vessel for which it has the at least one spray nozzle, the substrate, the measuring means, the heating means, the control means, a second transportation means for transporting the substrate into a remaining one of the at least two vessels and the evacuation structure.

4. The thin-film fabrication apparatus according to claim 1, further comprising press-forming means in the vacuum vessel for press-forming the material deposited on the substrate.

5. The thin-film fabrication apparatus according to claim 2, further comprising press-forming means in the vacuum vessel for press-forming the material deposited on the substrate.

6. The thin-film fabrication apparatus according to claim 3, further comprising press-forming means in at least one of the at least two vessels for press-forming the material deposited on the substrate.

7. The thin-film fabrication apparatus according to claim 1, further comprising sealing means for sealing the fabricated thin film in a clean, sealed vessel free of either floating particles or contaminant gases, said sealed vessel being provided within at least one of the at least two vessels or connected with at least one of the at least two vessels via an airtight door.

8. The thin-film fabrication apparatus according to claim 2, further comprising sealing means for sealing the fabricated thin film in a clean, sealed vessel free of either floating particles or contaminant gases, said sealed vessel being provided within at least one of the at least two vessels or connected with at least one of the at least two vessels via an airtight door.

9. The thin-film fabrication apparatus according to claim 3, further comprising sealing means for sealing the fabricated thin film in a clean, sealed vessel free of either floating particles or contaminant gases, said sealed vessel being provided within at least one of the at least two vessels or connected with at least one of the at least two vessels via an airtight door.

10. The thin-film fabrication apparatus according to claim 4, further comprising sealing means for sealing the fabricated thin film in a clean, sealed vessel free of either floating particles or contaminant gases, said sealed vessel being provided within at least one of the at least two vessels or connected with at least one of the at least two vessels via an airtight door.

11. The thin-film fabrication apparatus according to claim 5, further comprising sealing means for sealing the fabricated thin film in a clean, sealed vessel free of either floating particles or contaminant gases, said sealed vessel being provided within at least one of the at least two vessels or connected with at least one of the at least two vessels via an airtight door.

12. The thin-film fabrication apparatus according to claim 6, further comprising sealing means for sealing the fabricated thin film in a clean, sealed vessel free of either floating particles or contaminant gases, said sealed vessel being within at least one of the at least two vessels or connected with at least one of the at least two vessels via an airtight door.

13. The thin-film fabrication apparatus according to claim 1, further comprising a structure for supporting the substrate in the vacuum vessel or sealed vessel provided with a substrate adhesion structure.

14. The thin-film fabrication apparatus according to claim 2, further comprising a structure for supporting the substrate in the vacuum vessel or sealed vessel provided with a substrate adhesion structure.

15. The thin-film fabrication apparatus according to claim 3, further comprising a structure for supporting the substrate in the vacuum vessel or sealed vessel provided with a substrate adhesion structure.

16. The thin-film fabrication apparatus according to claim 4, further comprising a structure for supporting the substrate in the vacuum vessel or sealed vessel provided with a substrate adhesion structure.

17. The thin-film fabrication apparatus according to claim 5, further comprising a structure for supporting the substrate in the vacuum vessel or sealed vessel provided with a substrate adhesion structure.

18. The thin-film fabrication apparatus according to claim 6, further comprising a structure for supporting the substrate in the vacuum vessel or sealed vessel provided with a substrate adhesion structure.

19. The thin-film fabrication apparatus according to claim 7, further comprising a structure for supporting the substrate in the vacuum vessel or sealed vessel provided with a substrate adhesion structure.

20. The thin-film fabrication apparatus according to claim 8, further comprising further comprising a structure for supporting the substrate in the vacuum vessel or sealed vessel provided with a substrate adhesion structure.

21. The thin-film fabrication apparatus according to claim 9, further comprising a structure for supporting the substrate in the vacuum vessel or sealed vessel provided with a substrate adhesion structure.

22. The thin-film fabrication apparatus according to claim 10, further comprising a structure for supporting the substrate in the vacuum vessel or sealed vessel provided with a substrate adhesion structure.

23. The thin-film fabrication apparatus according to claim 11, further comprising a structure for supporting the substrate in the vacuum vessel or sealed vessel provided with a substrate adhesion structure.

24. The thin-film fabrication apparatus according to claim 12, further comprising a structure for supporting the substrate in the vacuum vessel or sealed vessel provided with a substrate adhesion structure.

25. The thin-film fabrication apparatus according to claim 1, wherein the heating means is at least one of visible light heating means and infrared heating means.

26. The thin-film fabrication apparatus according to claim 2, wherein the heating means is at least one of visible light heating means and infrared heating means.

27. The thin-film fabrication apparatus according to claim 13, wherein the heating means is at least one of visible light heating means and infrared heating means.

28. The thin-film fabrication apparatus according to claim 14, wherein the heating means is at least one of visible light heating means and infrared heating means.

29. The thin-film fabrication apparatus according to claim 15, wherein the heating means is at least one of visible light heating means and infrared heating means.

30. The thin-film fabrication apparatus according to claim 16, wherein the heating means is at least one of visible light heating means and infrared heating means.

31. The thin-film fabrication apparatus according to claim 17, wherein the heating means is at least one of visible light heating means and infrared heating means.

32. The thin-film fabrication apparatus according to claim 18, wherein the heating means is at least one of visible light heating means and infrared heating means.

33. The thin-film fabrication apparatus according to claim 19, wherein the heating means is at least one of visible light heating means and infrared heating means.

34. The thin-film fabrication apparatus according to claim 20, wherein the heating means is at least one of visible light heating means and infrared heating means.

35. The thin-film fabrication apparatus according to claim 21, wherein the heating means is at least one of visible light heating means and infrared heating means.

36. The thin-film fabrication apparatus according to claim 22, wherein the heating means is at least one of visible light heating means and infrared heating means.

37. The thin-film fabrication apparatus according to claim 23, wherein the heating means is at least one of visible light heating means and infrared heating means.

38. The thin-film fabrication apparatus according to claim 24, wherein the heating means is at least one of visible light heating means and infrared heating means.

* * * * *

UNITED STATES PATENT AND TRADEMARK OFFICE
CERTIFICATE OF CORRECTION

PATENT NO. : 6,319,321 B1  Page 1 of 1
DATED : November 20, 2001
INVENTOR(S) : Hiraga et al.

It is certified that error appears in the above-identified patent and that said Letters Patent is hereby corrected as shown below:

<u>Title page,</u>
Item [45] and the Notice information should read:
-- [45] Date of Patent: *Nov. 20, 2001 --
-- [*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Twenty-fifth Day of June, 2002

Attest:

JAMES E. ROGAN
Attesting Officer  Director of the United States Patent and Trademark Office

UNITED STATES PATENT AND TRADEMARK OFFICE
CERTIFICATE OF CORRECTION

PATENT NO.    : 6,319,321 B1
DATED         : November 20, 2001
INVENTOR(S)   : Hiraga et al.

It is certified that error appears in the above-identified patent and that said Letters Patent is hereby corrected as shown below:

<u>Title page,</u>
Item [73], the Assignee information should read:

-- [73]  Assignee:  Agency of Industrial Science & Technology,
Ministry of International Trade & Industry, Tokyo;
Dainichiseika Color & Chemicals MFG. Co., Ltd., Tokyo;
Takashi Hiraga, Tetsuo Moriya, both of Tsukuba, all of (JP) --

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,319,321 B1  
DATED : November 20, 2001  
INVENTOR(S) : Hiraga et al.

It is certified that error appears in the above-identified patent and that said Letters Patent is hereby corrected as shown below:

Title page,
Item [73], the Assignee information should read:

-- [73] Assignee: Agency of Industrial Science & Technology, Ministry of International Trade & Industry; Tokyo; Dainichiseika Color & Chemicals MFG. Co., Ltd., Tokyo, both of (JP) --

This certificate supersedes Certificate of Correction issued October 22, 2002.

Signed and Sealed this

Twenty-sixth Day of July, 2005

JON W. DUDAS  
*Director of the United States Patent and Trademark Office*